United States Patent
Knowles

(10) Patent No.: US 7,899,449 B2
(45) Date of Patent: Mar. 1, 2011

(54) DEMAND-BASED PROVISIONING FOR A MOBILE COMMUNICATION DEVICE

(75) Inventor: Michael Knowles, Waterloo (CA)

(73) Assignee: Research In Motion Limited, Waterloo (CA)

( * ) Notice: Subject to any disclaimer, the term of this patent is extended or adjusted under 35 U.S.C. 154(b) by 34 days.

(21) Appl. No.: 12/350,989

(22) Filed: Jan. 9, 2009

(65) Prior Publication Data

US 2009/0124247 A1    May 14, 2009

Related U.S. Application Data

(63) Continuation of application No. 11/371,685, filed on Mar. 9, 2006, now Pat. No. 7,493,111, which is a continuation of application No. 10/663,582, filed on Sep. 16, 2003, now Pat. No. 7,035,630.

(51) Int. Cl.
    *H04M 3/00*    (2006.01)
(52) U.S. Cl. .......................................... 455/419; 455/418
(58) Field of Classification Search ........................ None
    See application file for complete search history.

(56) References Cited

U.S. PATENT DOCUMENTS

| 6,122,503 | A   | 9/2000  | Daly |
| 6,564,055 | B1  | 5/2003  | Hronek |
| 7,035,630 | B2* | 4/2006  | Knowles .................. 455/419 |
| 7,493,111 | B2* | 2/2009  | Knowles .................. 455/419 |
| 2003/0027581 | A1* | 2/2003 | Jokinen et al. ............ 455/456 |
| 2003/0065738 | A1  | 4/2003 | Yang et al. |
| 2004/0242209 | A1  | 12/2004 | Kruis et al. |

FOREIGN PATENT DOCUMENTS

| EP | 1204290 A2 | 5/2002 |
| JP | 10-160491  | 6/1998 |
| JP | 11-257975  | 9/1999 |
| JP | 2000-333258 | 11/2000 |
| JP | 2001-197564 | 7/2001 |

* cited by examiner

*Primary Examiner* — Erika A Gary
(74) *Attorney, Agent, or Firm* — Jones Day; Krishna K. Pathiyal; Robert C. Liang

(57) ABSTRACT

In accordance with the teachings described herein, systems and methods are provided for providing demand-based provisioning for a mobile communication device. A provisioning server may be used to receive a provisioning update request from the mobile communication device and in response to the provisioning update request transmit a service update data message to the mobile communication device. The service update data message may include service information for the mobile communication device that is received by the provisioning server from at least one of a plurality of service providers. The mobile communication device may be operable to detect a triggering event and transmit the provisioning update request to the provisioning server in response to the triggering event.

13 Claims, 4 Drawing Sheets

DEMAND-BASED PROVISIONING FOR A MOBILE COMMUNICATION DEVICE

This is a continuation of U.S. patent application Ser. No. 11/371,685, filed on Mar. 9, 2006 (now U.S. Pat. No. 7,493,111), which is a continuation of U.S. patent application Ser. No. 10/663,582, filed on Sep. 16, 2003 (now U.S. Pat. No. 7,035,630). These prior applications are hereby incorporated into this application by reference.

FIELD

The technology described in this patent document relates generally to the field of wireless communications. More particularly, a system and method for providing demand-based provisioning is described that is particularly well-suited for use with wireless two-way messaging devices, cellular telephones, personal digital assistants (PDAs), or other types of mobile communication devices.

BACKGROUND AND SUMMARY

Typical mobile communications devices include applications or services that must maintain up-to-date routing information and service parameters in order to stay in communication with a wireless service provider. However, if a service provider attempts to update every subscribed device with push-based over-the-air (OTA) provisioning packets each time routing or provisioning information for a particular service is changed, there is a potential to flood the network.

In accordance with the teachings described herein, systems and methods are provided for providing demand-based provisioning for a mobile communication device. A provisioning server may be used to receive a provisioning update request from the mobile communication device and in response to the provisioning update request transmit a service update data message to the mobile communication device. The service update data message may include service information for the mobile communication device that is received by the provisioning server from at least one of a plurality of service providers. The mobile communication device may be operable to detect a triggering event and transmit the provisioning update request to the provisioning server in response to the triggering event.

DETAILED DESCRIPTION

Figure 1:
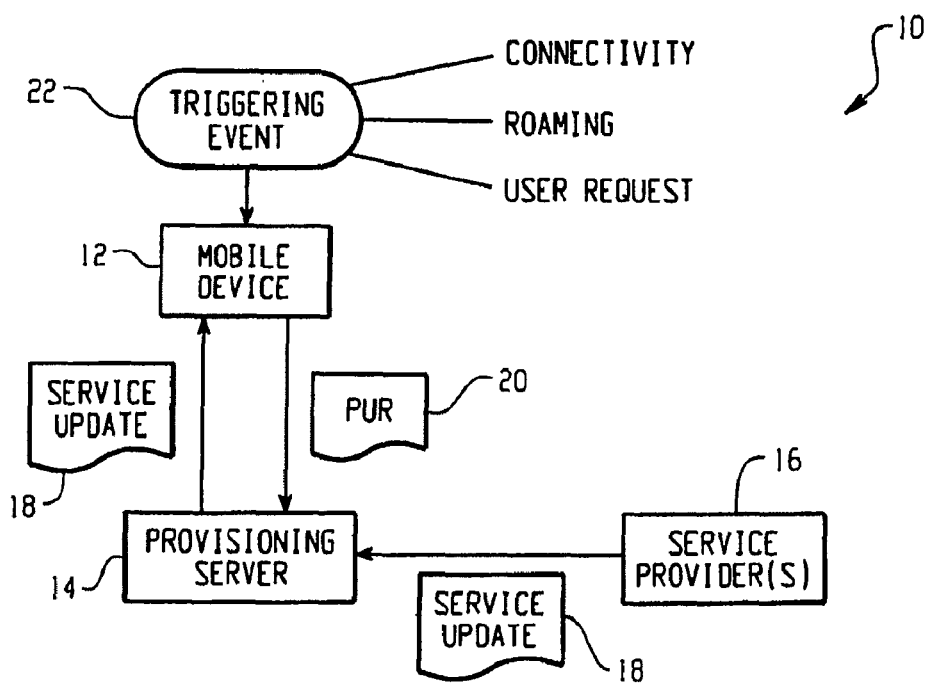
FIG. 1 is a block diagram of an example system for providing demand-based provisioning to a mobile communication device.

With reference now to the drawing figures, FIG. 1 is a block diagram of an example system 10 for providing demand-based provisioning to a mobile communication device 12. The system 10 includes a provisioning server 14 that is in communication with the mobile communication device 12 and with a plurality of service providers 16. The provisioning server 14 may, for example, communicate with the service providers 16 via a computer network, such as the Internet, and communicate with the mobile communication device 12 via a wireless communication network.

In operation, the provisioning server 14 receives and stores service updates 18 for the mobile communication device 12 from the service providers 16, and transmits the service updates 18 to the mobile communication device 12 upon receipt of a provisioning update request (PUR) 20. A provisioning update request (PUR) 20 is generated by the mobile communication device 12 and transmitted to the provisioning server 14 when the mobile communication device 12 detects a triggering event 22. Triggering events 22 may include, for example, a wireless communication failure (e.g., a connectivity problem) between the mobile communication device 12 and the provisioning server 14, a communication failure between a particular application or service on the mobile device and one or more of its supporting services, a user request for updated provisioning or routing information, roaming to a different wireless network, or other events. In this manner, the mobile communication device 12 may automatically adapt to changing service information, such as changing routing information, access point names (APNs), IP addresses, ports, authentication parameters, service parameters, etc.

The mobile communication device 22 may be any device adapted to operate within a wireless network, such as a two-way communication device. The operation of the mobile communication device 22 may vary depending upon the wireless network in which the device 22 is intended to operate. For example, a mobile communication device 22 that operates in North America may include a communication subsystem designed to operate with the Mobitex™ mobile communication system or the DataTAC™ mobile communication system, whereas a wireless device 22 that operates in Europe may incorporate a General Packet Radio Service (GPRS) communication system. An example mobile communication device 12 is described below in more detail with reference to FIG. 5

The mobile communication device 22 is operable to detect a triggering event and transmit a provisioning update request (PUR) 20 to the provisioning server 14 in response to the triggering event. The provisioning update request 20 may identify one or more particular service providers 16 from which a service update(s) 18 (e.g., routing information, parameter information, etc.) is desired. Alternatively, the mobile communication device 22 may transmit a generic provisioning update request 20 to request all available or all applicable service updates 18. In addition, if the provisioning update request 20 is triggered by a wireless communication failure, then the mobile communication device 12 may allow the service 16 one or more attempts to retry the transmission before sending a provisioning update request 20 to the provisioning server 14.

The provisioning server 14 is operable to receive the provisioning update request 20 from the mobile communication device 12 and to transmit a service update data message 18 to the mobile communication device 12 in response to the provisioning update request 20. The service update data message 18 may include a service update 18 for the mobile communication device 12 that is received by the provisioning server 14 from at least one of the plurality of service providers 16. The service providers 16 may include, for example, an electronic mail service, a browser routing service, over-the-air (OTA) synchronization services, or other wireless-enabled services. For instance, services for redirecting electronic mail and calendar information to a mobile communication device 12 are described in co-owned U.S. Pat. Nos. 6,219,694; 6,463,464, and 6,463,463, which are hereby incorporated into the present application by reference.

Figure 2:
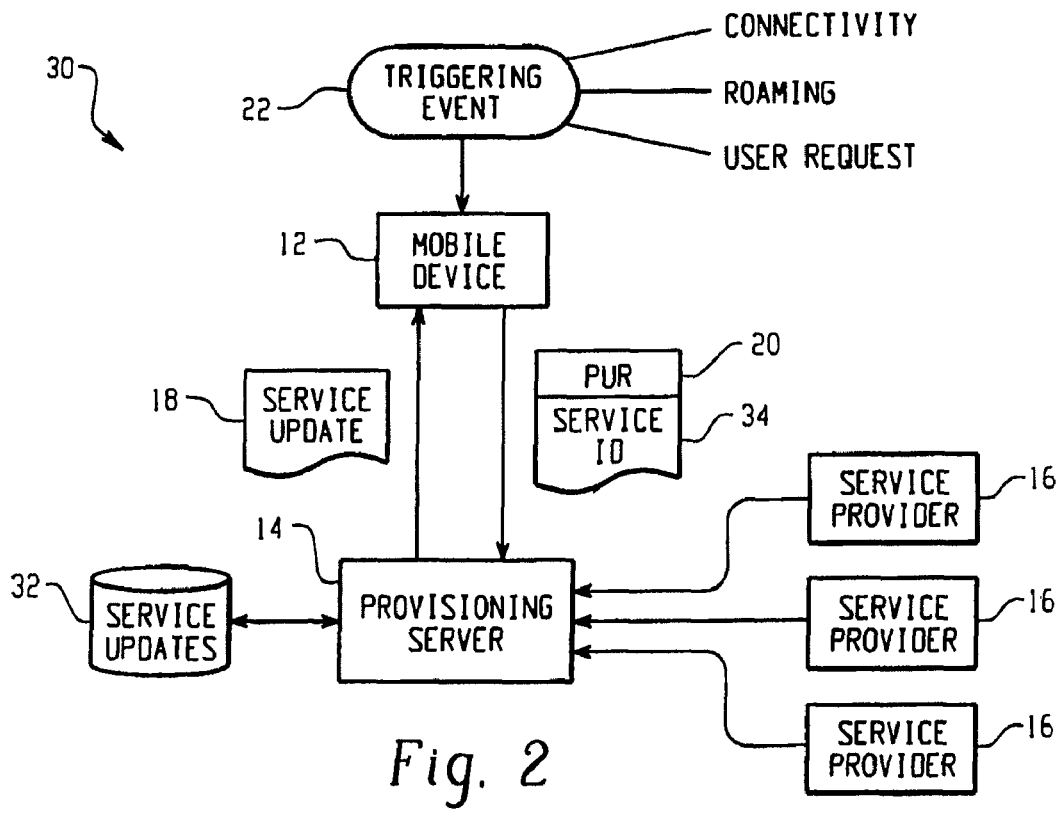
FIG. 2 is a block diagram of an example system for tracking demand-based provisioning information transmitted to a mobile communication device.

FIG. 2 is a block diagram of an example system 30 for tracking demand-based provisioning information transmitted to a mobile communication device 12. This system 30 is similar to that shown in FIG. 1, with the addition of a service updates database 32 coupled to the provisioning server 14. The service updates database 32 may be operable to store service information received from the service providers 16 and also to store update information that identifies which service information has already been transmitted to a particular mobile communication device 12. In this manner, the provisioning server 14 may track the update status of a plurality of mobile communication devices 12 and only transmit service updates 18 as needed.

For example, upon detecting a triggering event 22, a mobile communication device 12 may transmit a provisioning update request 20 to the provisioning server 14. The provisioning server 14 may then access the services updates database 32 to identify stored service updates that have not yet been transmitted to the mobile communication device 12. If the service updates database 32 includes a service update(s) that has not been transmitted to the mobile communication device 12, then the provisioning server 14 may encapsulate the identified service update(s) in a service update data message 18 and transmit the packet 18 to the mobile communication device 12 via a wireless network.

In addition, the provisioning update request 20 from the mobile communication device 12 may identify one or more particular service providers 34. For example, the provisioning update request 20 may identify the service provider(s) 16 for which the mobile communication device 12 has subscribed and/or the service provider(s) 16 from which the mobile device user desires updates. If a service provider identification 34 is included in the PUR 20, then the provisioning server 14 may access the service updates database 32 to determine if update information has been received and stored from the identified service provider(s) 34 and also if the relevant update information has yet been transmitted to the mobile communication device 12. If new update information is available for the identified service provider(s) 34, then the provisioning server 14 may packetize the data and transmit the resultant service update data message 18 to the mobile communication device 12.

Figure 3:
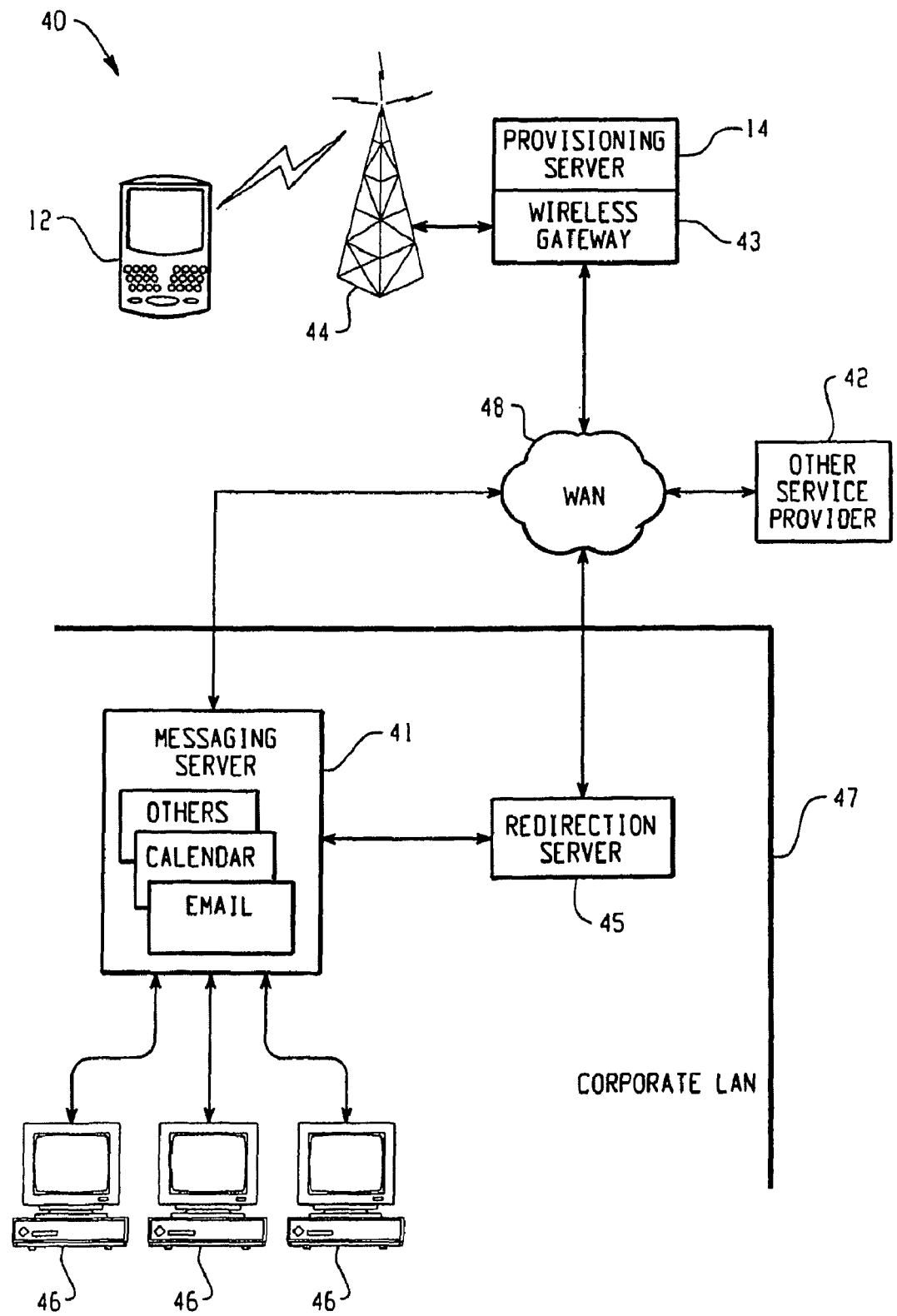
FIG. 3 is a block diagram of an example system for providing demand-based provisioning and for pushing messaging information to a mobile communication device.

FIG. 3 is a block diagram of an example system 40 for providing demand-based provisioning and pushing of messaging information to a mobile communication device 12. The system 40 includes a messaging server 41 and a redirection server 45 operating on a local area network (LAN) 47, a wireless gateway 43 and provisioning server 14 that may communicate with the LAN 47 via a wide area network (WAN) 48, and a mobile communication device 12 that may communicate with the wireless gateway 43 and provisioning server 14 via a wireless network 44. Also illustrated are one or more other service providers 42 that may communicate with the mobile communication device 12 via the wireless gateway 43 and provisioning server 14.

In operation, the redirection server 45 and other service provider(s) 42 may send and receive information to and from the mobile communication device 12 via the wireless gateway 43. In addition, service updates may also be sent from the redirection server 45 and other service provider(s) 42 and stored by the provisioning server 14 for transmission to the mobile communication device 12 upon receipt of a provisioning update request (PUR), as described above.

Within the local area network 47, the messaging server 41 is networked with a plurality of network computers 46 and executes one or more messaging application(s), such as an electronic mail application, a calendar application, a To Do list application, an address book application, or others. In addition, the messaging server 41 may be configured to send and receive messaging information to and from other messaging servers or similar systems via the WAN 48. The redirection server 45 is coupled to the messaging server 41 and is operable to push messaging information, such as e-mail or calendar information, from the messaging server to a mobile communication device 12 via the wireless gateway 43.

In addition, the redirection server 45 may send service updates to the provisioning server 14 that are stored and transmitted to the mobile communication device 12 upon receipt of a provisioning update request, as described above with reference to FIGS. 1 and 2. That is, updated service information, such as routing or provisioning information, relating to wireless messaging service provided by the redirection server 45 may be uploaded to the mobile communication device 12 when the mobile communication device 12 detects a triggering event. In this manner, the mobile communication device 12 may be automatically updated with current service information. In addition, service updates relating to the wireless messaging service could also be transmitted to the provisioning server 14 by a service provider(s) other than the redirection server 45. For instance, a wireless network service provider may also provide service updates affecting the operation of the redirection server 45 to push messaging information to the mobile communication device 12.

Service update information may preferably be encrypted and encapsulated in one or more data packets at the redirection server 45 or other service provider 42 and transmitted to the provisioning server 14 over a wide area network (WAN) 43, such as the Internet. The provisioning server 14 is shown in FIG. 3 as part of the wireless gateway 43. It should be understood, however, that the provisioning server 14 could also operate separately from the wireless gateway 43. Thus, service update information destined for the provisioning server 14 could be addressed to the wireless gateway 43, or could alternatively be received directly by the provisioning server 14 and then uploaded to the mobile communication device 12 via the wireless gateway 43.

The wireless gateway 43 provides an interface between the WAN 48 and the wireless network 44, which transmits data packets to the mobile communication device 12. The wireless gateway 43 may, for example, convert the data between WAN protocols and wireless network protocols, address the data packet for transmission over the wireless network using the wireless identification, store and forward data to and from the mobile communication device 12, and perform other typical interface functions.

Figure 4:
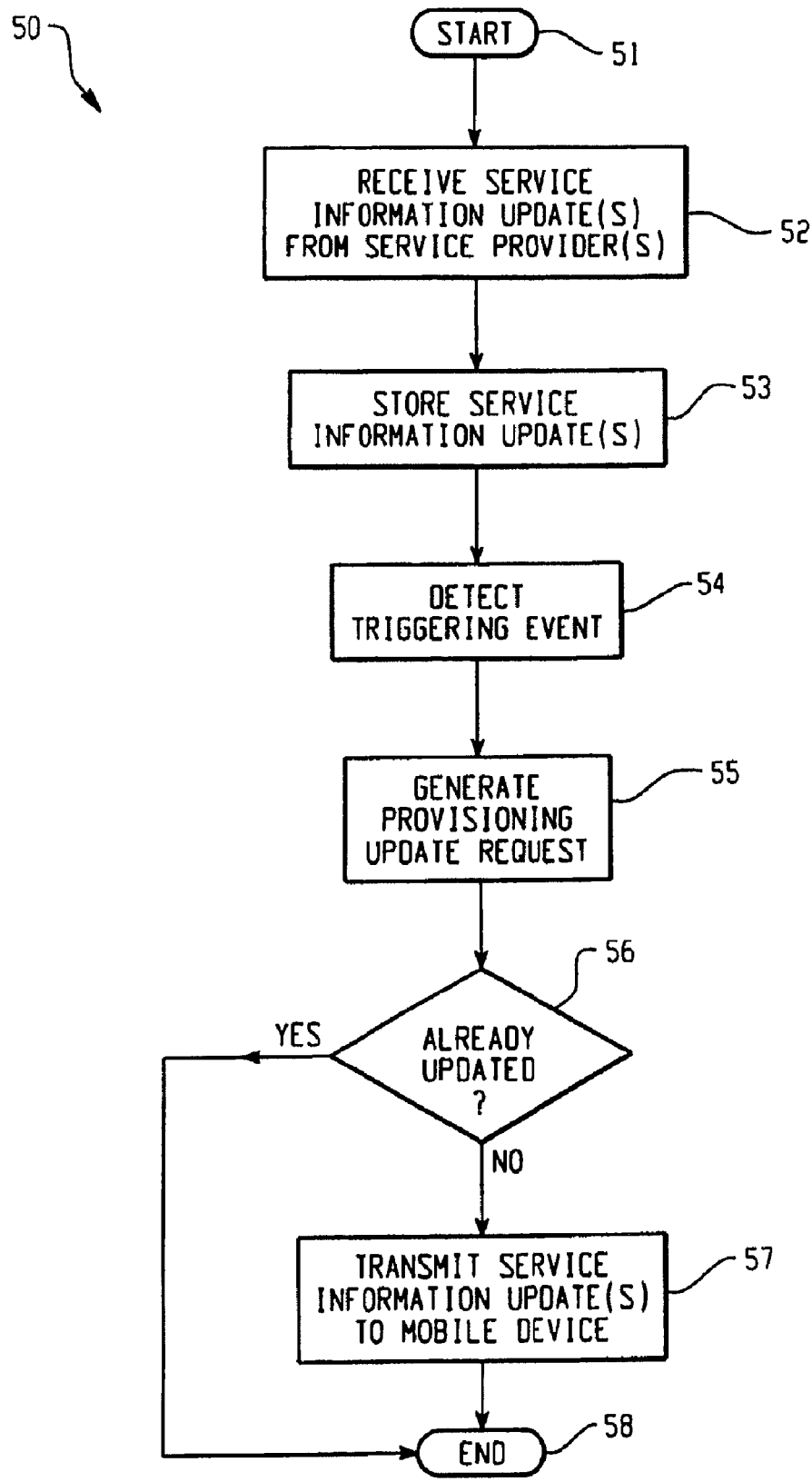
FIG. 4 is a flow diagram of an example method for providing demand-based provisioning to a mobile communication device.

FIG. 4 is a flow diagram of an example method 50 for providing demand-based provisioning to a mobile communication device. The method begins at step 51. At step 52, updated service information is received from one or more of a plurality of service providers, and the received information is stored at step 53. The method 50 then awaits the detection of a triggering event, such as a wireless communication failure between the mobile communication device and one of the service providers. Upon detecting a triggering event at step 54, a provisioning update request (PUR) is generated indicating that new service information from the service providers should be transmitted to the mobile communication device. At step 56, the method determines if the stored service update (s) have already been transmitted to the mobile communication device, for example upon the occurrence of a previous triggering event. If the stored service update(s) have already been transmitted to the mobile communication device, then the method ends at step 58. If the stored service update(s) have not yet been transmitted to the mobile communication device, however, then the service update(s) are transmitted over a wireless network to the mobile communication device, and the method ends at step 58.

Figure 5:
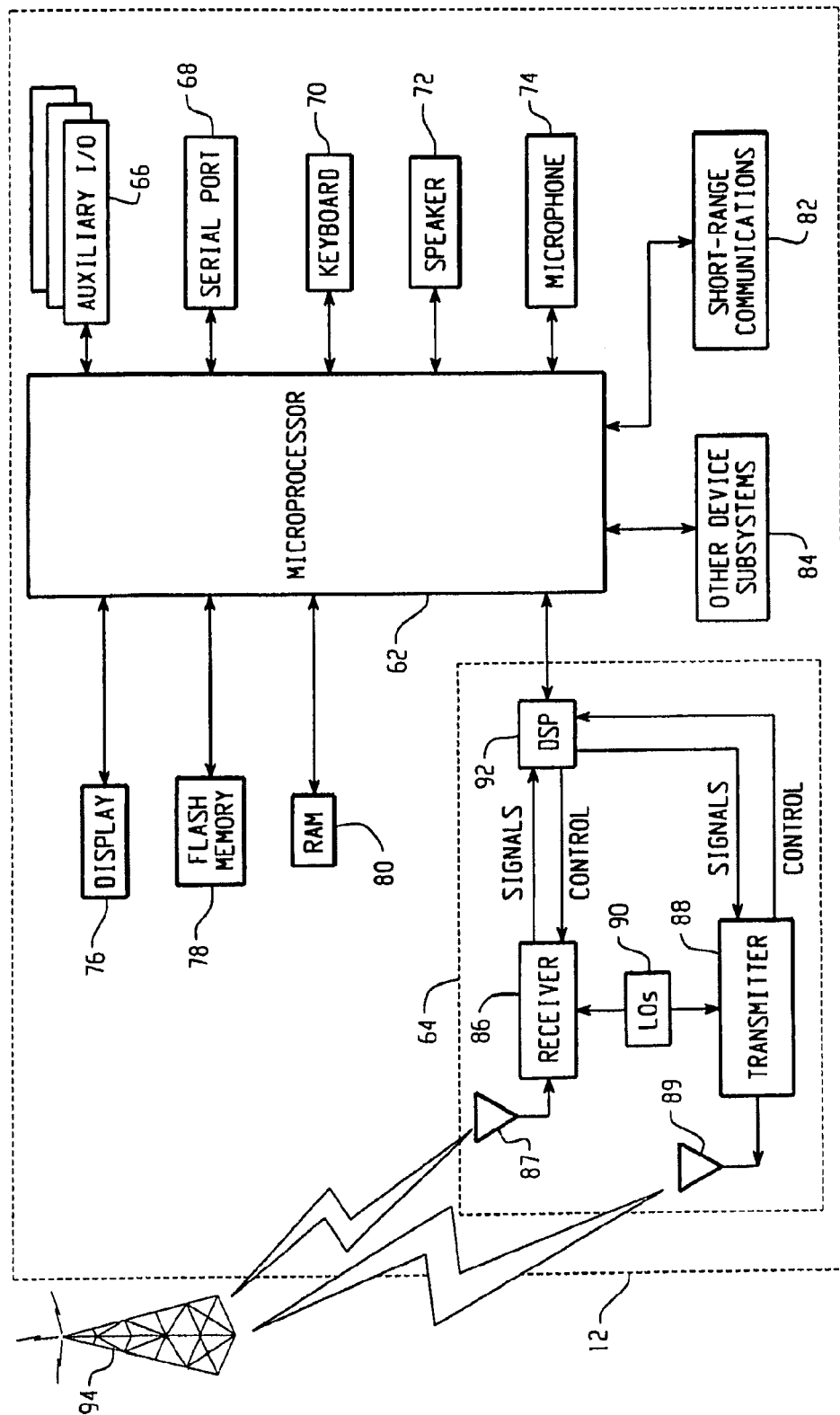
FIG. 5 is a block diagram of an example mobile communication device.

FIG. 5 is a more detailed block diagram of one exemplary mobile communications device 12. The mobile communications device 12 includes a processing device 62, a communications subsystem 64, a short-range communications subsystem 82, input/output devices 66-76, memory devices 78, 80, and various other device subsystems 84. The mobile communications device 12 is preferably a two-way communication device having voice and data communication capabilities. In addition, the device 12 preferably has the capability to communicate with other computer systems via the Internet.

The processing device 62 controls the overall operation of the mobile communications device 62. System software executed by the processing device 62 is preferably stored in a persistent store such as a flash memory 78, but may also be stored in other types of memory devices, such as a read only memory (ROM) or similar storage element. In addition, system software, specific device applications, or parts thereof, may be temporarily loaded into a volatile store, such as a random access memory (RAM) 80. Communication signals received by the mobile device may also be stored to RAM 80.

The processing device 62, in addition to its operating system functions, enables execution of software applications on the device 12. A predetermined set of applications that control basic device operations, such as data and voice communications, may be installed on the device 12 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 94. Preferably, the PIM data items are seamlessly integrated, synchronized and updated via the wireless network 94 with the device user's corresponding data items stored or associated with a host computer system.

Communication functions, including data and voice communications, are performed through the communication subsystem 64, and possibly through the short-range communications subsystem 82. If the mobile communications device 12 is enabled for two-way communications, then the communication subsystem 64 includes a receiver 86, a transmitter 88, and a processing module, such as a digital signal processor (DSP) 92. In addition, the communication subsystem 64, configured as a two-way communications device, includes one or more, preferably embedded or internal, antenna elements 87, 89, and local oscillators (LOs) 90. The specific design and implementation of the communication subsystem 64 is dependent upon the communication network in which the mobile device is intended to operate. For example, a mobile communication device designed for operation on the Mobitex™ network may have a different communication subsystem 64 than a similar device designed to operate on a GPRS network.

Network access requirements vary depending upon the type of communication system. For example, in the Mobitex™ and DataTAC™ networks, mobile communications devices 12 are registered on the network using a unique personal identification number or PIN associated with each device. In GPRS networks, however, network access is associated with a subscriber or user of a device 12. A GPRS device therefore requires a subscriber identity module, commonly referred to as a SIM card, in order to operate on the GPRS network.

When required network registration or activation procedures have been completed, the mobile communications device 12 may send and receive communication signals over the communication network. Signals received by the antenna 87 through the communication network 94 are input to the receiver 86, which may perform such common receiver functions as signal amplification, frequency down conversion, filtering, channel selection, and analog-to-digital conversion. Analog-to-digital conversion of the received signal allows the DSP 92 to perform more complex communication functions, such as demodulation and decoding. In a similar manner, signals to be transmitted are processed by the DSP 92, and are input to the transmitter 88 for digital-to-analog conversion, frequency up-conversion, filtering, amplification and transmission over the communication network 94 via the antenna 89.

In addition to processing communication signals, the DSP 92 provides for receiver 86 and transmitter 88 control. For example, gains applied to communication signals in the receiver 86 and transmitter 88 may be adaptively controlled through automatic gain control algorithms implemented in the DSP 92.

In a data communication mode, a received signal, such as a text message or web page download, is processed by the communication subsystem 64 and input to the processing device 62. The received signal is then further processed by the processing device 62 for output to a display 76, or alternatively to some other auxiliary I/O device 66. A device user may also compose data items, such as e-mail messages, using a keyboard 70, such as a QWERTY-style keyboard, and/or some other auxiliary I/O device 66, such as a touchpad, a rocker switch, a thumb-wheel, or some other type of input device. The composed data items may then be transmitted over the communication network 94 via the communication subsystem 64.

In a voice communication mode, overall operation of the device 12 is substantially similar to the data communication mode, except that received signals are output to a speaker 72, and signals for transmission are generated by a microphone 74. Alternative voice or audio I/O subsystems 84, such as a voice message recording subsystem, may also be implemented on the device. In addition, the display 76 may also be utilized in voice communication mode, for example to display the identity of a calling party, the duration of a voice call, or other voice call related information.

The short-range communications subsystem 82 enables communication between the mobile communications device 12 and other proximate systems or devices, which need not necessarily be similar devices. For example, the short-range communications subsystem 82 may include an infrared device and associated circuits and components, or a Bluetooth™ communication module to provide for communication with similarly-enabled systems and devices.

This written description uses examples to disclose the invention, including the best mode, and also to enable a person skilled in the art to make and use the invention. The patentable scope of the invention may include other examples that occur to those skilled in the art. For example, in one alternative embodiment, the provisioning server 14 may detect the occurrence of triggering events 22 instead of the mobile communication device 12. For instance, the provisioning server 14 may be configured to detect an interruption in wireless service to the mobile communication device 12 or some other type of triggering event, and may automatically push stored service update information 18 to the mobile communication device 12 in response to the triggering event.

It is claimed:

1. A system for updating service information in a mobile communication device, the system comprising:
    a provisioning server configured to receive service information for the mobile communication device from a service provider and store the service information in a service update database;
    the provisioning server being further configured to determine if the stored service information has previously been transmitted to the mobile communication device, and if the stored service information has not previously been transmitted to the mobile communication device, then the provisioning server being configured to encapsulate the service information in a service update data message and transmit the service update data message to the mobile communication device.

2. The system of claim 1, wherein the service update data message is transmitted in response to a triggering event.

3. The system of claim 2, wherein the triggering event is a user request from the mobile communication device.

4. The system of claim 2, wherein the triggering event is a wireless communication failure between the mobile communication device and the provisioning server.

5. The system of claim 2, wherein the triggering event is generated when the mobile communication device roams to a new wireless network.

6. The system of claim 2, wherein the service provider is a wireless messaging service.

7. The system of claim 1, wherein the service update database is configured to store update information that identifies service information that has been transmitted to the mobile communication device, and wherein the provisioning server is configured to determine from the update information whether the service information has already been transmitted to the mobile communication device.

8. A method for updating service information in a mobile communication device, the method comprising:
    receiving, at a provisioning server, service information for the mobile communication device from a service provider;
    storing the service information in a service update database;
    the provisioning server determining if the stored service information has previously been transmitted to the mobile communication device; and
    based on a determination that the stored service information has not previously been transmitted to the mobile communication device, the provisioning server encapsulating the service information in a service update data message and transmitting the service update data message to the mobile communication device.

9. The method of claim 8, wherein the service update data message is transmitted in response to a triggering event.

10. The method of claim 9, wherein the triggering event is a user request from the mobile communication device.

11. The method of claim 9, wherein the triggering event is a wireless communication failure between the mobile communication device and the provisioning server.

12. The method of claim 9, wherein the triggering event is generated when the mobile communication device roams to a new wireless network.

13. The method of claim 9, wherein the service provider is a wireless messaging service provider.

* * * * *